(12) United States Patent
Scholz et al.

(10) Patent No.: US 6,797,787 B2
(45) Date of Patent: Sep. 28, 2004

(54) EPOXIDIZED POLYALKENYLENES AND METHOD FOR THEIR PREPARATION

(75) Inventors: Peter Scholz, Lehesten (DE); Bernd Ondruschka, Leipzig (DE); Peter Denkinger, Nottuin (DE); Werner Freitag, Morristown, NJ (US); Martina Ortelt, Duelmen (DE); Werner Andrejewski, Dorsten (DE); Andreas Berlineanu, Leipzig (DE)

(73) Assignee: Degussa AG, Duesseldorf (DE)

( * ) Notice: Subject to any disclaimer, the term of this patent is extended or adjusted under 35 U.S.C. 154(b) by 32 days.

(21) Appl. No.: 10/322,635

(22) Filed: Dec. 19, 2002

(65) Prior Publication Data

US 2003/0139537 A1 Jul. 24, 2003

(30) Foreign Application Priority Data

Dec. 22, 2001 (DE) .......................................... 101 63 783

(51) Int. Cl.[7] .................................................. C08F 8/46
(52) U.S. Cl. ........................................ 525/386; 525/529
(58) Field of Search .................................. 525/386, 529

(56) References Cited

U.S. PATENT DOCUMENTS 3,022,322 A * 2/1962 Wheelock et al. .......... 549/526
4,780,507 A    10/1988 Gaku et al.
2001/0014399 A1 * 8/2001 Jasne ......................... 428/413

OTHER PUBLICATIONS

C. E. Wheelock, Journal of Industrial and Engineering Chemistry, vol. 50, No. 3, XP–009021926, pp. 299–304, "Epoxidation of Liquid Polybutadiene", Mar. 1958.

* cited by examiner

Primary Examiner—William K. Cheung
(74) Attorney, Agent, or Firm—Oblon, Spivak, McClelland, Maier & Neustadt, P.C.

(57) ABSTRACT

An epoxidized polyalkenylene is prepared reacting a polyalkenylene, an aqueous solution of 15 to 90% by volume of hydrogen peroxide and a carboxylic acid having from 1 to 3 carbon atoms in the presence of a catalyst which is phosphonic acid, a derivative of phosphonic acid or a mixture thereof, without addition of an organic solvent or water, to obtain the epoxidized polyalkenylene. The epoxidized polyalkenylene has a number-average molar mass of between 500 and 50 000 g/mol and an epoxide oxygen content of between 1 and 25 percent by mass.

16 Claims, No Drawings

EPOXIDIZED POLYALKENYLENES AND METHOD FOR THEIR PREPARATION

BACKGROUND OF THE INVENTION

1. Field of the Invention

The present invention relates to a substantially solventless, environmentally unburdensome process for preparing a high-grade epoxidized polyalkenylene.

2. Discussion of the Background

Known processes suffer from the use of organic solvents, often aromatic and/or halogenated during the epoxidation and/or workup. These solvents are then difficult to remove from the polymer. Moreover, a variety of epoxidation by-products are poorly soluble in these solvents and may remain in the polymer. Known processes minimize this by adding an extraction step with water or solvent/water mixtures, very often in multistage form. The subsequent separation of the organic phase from the aqueous phase is an additional process step.

Epoxidized polyalkenylenes enjoy a diverse breadth of applications, particularly as agents for surface enhancement and surface sealing, hydrophobization, and for solidifying compounded formulations.

Polyalkenylenes belong to the olefinic polymers group, and thus the addition of an epoxide oxygen onto the double bond in accordance with the Prileshaev reaction is long-established state of the art. The carboxylic acids used for this purpose, such as formic acid, acetic acid (DE-A 25 54 093, U.S. Pat. No. 4,309,516), benzoic or propionic acid (DE-A 32 38 886), remain in part in the epoxidized polymers after the product has been isolated, or must be removed by means of purification techniques, which are very complex. Additionally, the organic solvent must be separated from the water. DE-A 35 28 007 describes a process in which the epoxidation step in benzene, performed by means of perpropionic acid, is followed by thirteen washing and distillation stages for removing the carboxylic acid and the solvent. Given the ready solubility of benzene in the polyalkenylene, moreover, it can be assumed that a fraction of benzene will remain in the product. Other processes (FR 2 320 972, DE A 25 42 709) use monoperphthalic acid, which is subsequently separated by time-consuming and solvent-consuming filtration. However, it can be assumed that despite the great effort it will be impossible to completely separate off the acid, due to a certain solubility in the epoxidized polymer.

Other transition-metal-catalyzed epoxidations suffer from the difficulty of preparing the catalysts and their costliness (J. Polym. Sci., Part C: Poly Lett. 1990, 28, 285; Polym. Chem. 1991, 29, 547) and/or the burdensome technological conditions which their use dictates (phase transfer catalysis: WO 9 828 338). Again, this is followed by the separation of the organic solvents.

DE-A 32 38 886 describes the epoxidation of conjugated diolefin polymers and vegetable oils in solvents (examples), although this is not the subject matter of the invention. Even if the epoxidation step in water were successful, the subsequent extraction would be impossible without an additional solvent (isopropanol).

SUMMARY OF THE INVENTION

It is therefore an object of the present invention to provide a substantially solventless epoxidation process which avoids the use of environmentally harmful solvents at all stages, thereby minimizing the washing effort, and which provides a high-grade product.

Another object of the present invention is to provide effective catalysts for use in epoxidation processes.

These and other objects have been achieved by the present invention the first embodiment of which includes a process for preparing an epoxidized polyalkenylene, comprising:

reacting a polyalkenylene, an aqueous solution of 15 to 90% by volume of hydrogen peroxide and a carboxylic acid having from 1 to 3 carbon atoms in the presence of a catalyst comprising a member selected from the group consisting of phosphonic acid, a derivative of phosphonic acid, and mixtures thereof, without addition of an organic solvent or water, to obtain said epoxidized polyalkenylene;

wherein said epoxidized polyalkenylene has a number-average molar mass of between 500 and 50 000 g/mol; and wherein said epoxidized polyalkenylene has an epoxide oxygen content of between 1 and 25% by mass.

DETAILED DESCRIPTION OF THE INVENTION

The present invention provides a process for preparing an epoxidized polyalkenylene having a number-average molar mass of between 500 and 50 000 g/mol and an epoxide oxygen content of between 1 and 25 percent by mass by reacting a polyalkylene, from 15 to 90% strength hydrogen peroxide, and a carboxylic acid having from 1 to 3 carbon atoms in the presence of a phosphonic acid and/or derivatives thereof as catalyst, without further addition of organic solvents or water. 15 to 90% strength hydrogen peroxide in the context of the present invention means an aqueous solution having 15 to 90% by volume of hydrogen peroxide. The number-average molar mass of the epoxidized polyalkenylene includes all values and subvalues therebetween, especially including 1000, 5000, 10000, 15000, 20000, 25000, 30000, 35000, 40000 and 45000 g/mol. The epoxide oxygen content of the epoxidized polyalkenylene includes all values and subvalues therebetween, especially including 5, 10, 15 and 20%. The strength of the hydrogen peroxide includes all values and subvalues therebetween, especially including 20, 30, 40, 50, 60, 70 and 80%.

The epoxidation reaction is conducted at a temperature of from 10 to 100° C., preferably 20 to 60° C. The reaction temperature includes all values and subvalues therebetween, especially including 20, 30, 40, 50, 60 70, 80 and 90° C.

The process of the invention resolves the above disadvantages of existing processes because the epoxidation takes place without the use of a solvent. An advantageous feature is that, in the subsequent workup of the products, water alone can be used as extractant. It has been found that there is no residue of free carboxylic acids in the epoxidized product when short-chain carboxylic acids ($C_1$–$C_3$) are used. Free carboxylic acids might be a cause of uncontrolled crosslinking of the epoxidized polyalkylene. The substances used as catalyst for the process are, surprisingly, highly active and effective, dissolving poorly in the polymer but very readily in water. Accordingly, they are very simple to separate from the reaction mixture. The process is preferably conducted in the presence of at least one aminophosphonic acid catalyst.

It has likewise been found, surprisingly, that the phosphonic acids and their derivatives, especially the aminophosphonic acids, are suitable catalysts in the preparation of epoxidation products from polyalkenylenes.

The present invention accordingly further provides for the use of phosphonic acid and/or derivatives thereof as catalysts in the preparation of epoxidation products from polyalkenylenes. Particularly preferred aminophosphonic acids are those specified in greater detail later on below. In principle, the catalysts may be used in both solventless and solvent-mediated processes. In addition, the organic peracid may be used directly or generated in situ. Preference is given to $C_1$–$C_3$ carboxylic acids, such as formic, acetic and/or propionic acid.

With particular preference, the catalysts are used in processes which are conducted substantially or totally without solvent.

Suitable polyalkenylene starting materials are preferably polymers based on monomeric dienes such as 1,3-butadiene, isoprene, 2,3-dimethyl-1,3-butadiene, and chloroprene. It is possible to use homopolymers or else copolymers of the aforementioned monomers, but preferably homopolymers, especially those of 1,3-butadiene. The polyalkenylenes may be 1,4- or 1,2-linked. Also possible, however, are mixtures of 1,2- and 1,4-linkages, in which case the 1,4-linkage can adopt both cis and trans arrangements. Very particular preference is given to a polybutadiene containing about 75% 1,4-cis, about 24% 1,4-trans, and about 1% 1,2-double bonds (Polyoil, Degussa).

Furthermore, it is also possible to use polyalkenylenes constructed from at least one of the abovementioned monomeric dienes and one or more vinyl compounds and/or alkenes. Examples of preferred vinyl compounds include styrenes and substituted styrenes, vinyl ethers, and acrylates or methacrylates. Examples of preferred alkenes include ethene, propene, butene, and isobutene.

Preferred carboxylic acids are formic, acetic or propionic acid, alone or in mixtures.

Phosphonic acid and/or derivatives thereof are used as catalysts. Particularly preferred catalysts are aminophosphonic acids, such as aminotrismethylenephosphonic acid (ATMP) (6419-19-8), aminotris(1-methyl-2,1-ethanediyl) phosphonic acid (107559-74-0), {aminotris(1-methylethylidene)}trisphosphonic acid (29557-57-1), {{(phosphonomethyl)imino}di-2,1-ethanediyl}bisphosphonic acid (220659-04-1), aminotrisetbylidenephosphonic acid (24573-69-1), [1-{bis(phosphonomethyl)amino}ethyl}phosphonic acid (45203 32 5), aminotrispropylidenephosphonic acid (45265-40-5), {{(2-phosphonoethyl)imino}bis(methylene)}bisphosphonic acid (68593-88-4), {1,2-ethanediylbis{aminobis(methylene)}}tetrakisphosphonic acid (1429-50-1), {1,3-propanediylbis{aminobis(methylene)}}tetrakisphosphonic acid (28444-52-2), N2,N2,N5,N5-tetrakis(phosphonomethyl)omithine (193553 86 5), {methylenebis{aminobis(methylene)}}tetrakisphosphonic acid (70235-52-8) (CA Registry numbers). Mixtures are also suitable. The amount of catalysts used may vary from 0.05 to 500 mmol per mole of polyalkenylene. The amount of catalyst includes all values and subvalues therebetween, especially including 1, 5, 10, 20, 30, 40, 50, 100, 150, 200, 250, 300, 350, 400 and 450 mmol.

The present invention further provides for the use of the epoxidized polyalkenylenes prepared in accordance with the present invention as reactants for polymer-analogous reactions and as ingredients in crosslinking systems. In accordance with the present invention they are used for preparing binders, adhesives, sealants, coating materials, and plasticizers, especially for producing paints, printing inks, printing plates, and soundproofing compositions.

Having generally described this invention, a further understanding can be obtained by reference to certain specific examples which are provided herein for purposes of illustration only, and are not intended to be limiting unless otherwise specified.

EXAMPLES

Example 1

| | |
|---|---|
| 600 g of Polyoil 110, Degussa | 0.333 mol |
| 60 ml of $H_2O_2$ (67%) | 1.312 mol |
| 12.76 ml of 85% HCOOH | 0.574 mol |
| 0.188 g of ATMP | 0.628 mmol |

600 g of Polyoil were charged to a sulfonating flask equipped with thermometer, stirrer, reflux condenser and dropping funnel. The mixture was warmed to 40° C. and all of the hydrogen peroxide was added. 6 ml of formic acid and 0.188 g of ATMP were added with vigorous stirring, which was continued for 30 minutes. Then the remainder of the formic acid (6.8 ml) was added, the mixture increased in temperature by 2° C. Thereafter the mixture was heated to 55° C. over 90 minutes and was left at 55° C. for a further 5 hours. The product was subsequently left to stand overnight. Afterward, the epoxidized polymer was washed twice with 500 ml of water, once with 500 ml of 10% strength sodium hydrogen carbonate, and then again three times with 500 ml of water. Washing was carried out in each case by adding water to the sulfonating flask, then stirring vigorously for 30 minutes and waiting until the phases separate. The aqueous phase was separated from the polymer phase in each case by withdrawing it under suction through an ascending tube.

The polymer was dried at 50° C. and 10 mbar on a rotary evaporator. The epoxide oxygen content of the polymer was 3.5 percent by mass.

Example 2

| | |
|---|---|
| 600 g of Polyoil 110, Degussa | 0.333 mol |
| 220 ml of $H_2O_2$ (30%) | 2.0 mol |
| 12.76 ml of 85% HCOOH | 0.574 mol |
| 0.188 g of ATMP | 0.628 mmol |

600 g of Polyoil were charged to a sulfonating flask equipped with thermometer, stirrer, reflux condenser and dropping funnel. The mixture was warmed to 40° C. and all of the hydrogen peroxide was added. 6 ml of formic acid and 0.188 g of ATMP were added with vigorous stirring, which was continued for 30 minutes. Then the remainder of the formic acid (6.8 ml) was added, the mixture increased in temperature by 2° C. Thereafter the mixture was heated to 55° C. over 90 minutes and was left at 55° C. for a further 5 hours. The product was subsequently left to stand overnight. Afterward, the epoxidized polymer was washed twice with 500 ml of water, once with 500 ml of 10% strength sodium hydrogen carbonate, and then again three times with 500 ml of water. Washing was carried out in each case by adding water to the sulfonating flask, then stirring vigorously for 30 minutes and waiting until the phases separate. The aqueous phase was separated from the polymer phase in each case by withdrawing it under suction through an ascending tube.

The polymer was dried at 50° C. and 10 mbar on a rotary evaporator. The epoxide oxygen content of the polymer was 3.4 percent by mass.

Example 3

| 700 g of Polyoil 110, Degussa | 0.389 mol |
| 133 g of H$_2$O$_2$ (50%) | 2.35 mol |
| 25 ml of 85% HCOOH | 1.12 mol |
| 0.5 g of ATMP | 1.67 mmol |

700 g of Polyoil were charged to a sulfonating flask equipped with thermometer, stirrer, reflux condenser and dropping funnel. The mixture was warmed to 45° C. and all of the hydrogen peroxide was added. 3 ml of formic acid and 0.5 g of ATMP were added with vigorous stirring, which was continued for 20 minutes. Then the remainder of the formic acid was added over the course of 4 hours in portions each of 2 ml, the mixture increased in temperature to 60° C. Thereafter the mixture was left at 55° C. for one hour. The product was subsequently left to stand overnight. Afterward, the epoxidized polymer was washed twice with 500 ml of water, once with 500 ml of 10% strength sodium hydrogen carbonate, and then again three times with 500 ml of water. Washing was carried out in each case by adding water to the sulfonating flask, then stirring vigorously for 30 minutes and waiting until the phases separate. The aqueous phase was separated from the polymer phase in each case by withdrawing it under suction through an ascending tube.

The polymer was dried at 50° C. and 10 mbar on a rotary evaporator. The epoxide oxygen content of the polymer was 5 percent by mass.

Example 4

| 500 g of Polyoil 110, Degussa | 0.278 mol |
| 176 ml of H2O2 (50%) | 3.1 mol |
| 32 ml of 85% HCOOH | 1.44 mol |
| 0.5 g of ATMP | 1.67 mmol |

500 g of Polyoil were charged to a sulfonating flask equipped with thermometer, stirrer, reflux condenser and dropping funnel. The mixture was warmed to 45° C. and all of the hydrogen peroxide was added. 4 ml of formic acid and 0.5 g of ATMP were added with vigorous stirring, which was continued for 20 minutes. Then the remainder of the formic acid was added over the course of 4 hours in portions each of 2 ml, the mixture increased in temperature to 60° C. Thereafter the mixture was left at 55° C. for one hour. The product was subsequently left to stand overnight. Afterward, the epoxidized polymer was washed twice with 500 ml of water, once with 500 ml of 10% strength sodium hydrogen carbonate, and then again three times with 500 ml of water. Washing was carried out in each case by adding water to the sulfonating flask, then stirring vigorously for 30 minutes and waiting until the phases separate. The aqueous phase was separated from the polymer phase in each case by withdrawing it under suction through an ascending tube.

The polymer was dried at 50° C. and 10 mbar on a rotary evaporator. The epoxide oxygen content of the polymer was 8.5 percent by mass.

The formulations and results set out in the above examples are not restricted either to the polymers specified therein or to the stated epoxide oxygen contents.

German patent application 101 63 783.7, filed Dec. 22, 2001, is incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. A process for preparing an epoxidized polyalkenylene, comprising:
   reacting a polyalkenylene, an aqueous solution of 15 to 90% by volume of hydrogen peroxide and a carboxylic acid having from 1 to 3 carbon atoms in the presence of a catalyst comprising a member selected from the group consisting of i) aminophosphonic acid and ii) mixtures of phosphonic acid, and aminophosphonic acid, without addition of an organic solvent or water, to obtain said epoxidized polyalkenylene;
   wherein said epoxidized polyalkenylene has a number-average molar mass of between 500 and 50 000 g/mol; and
   wherein said epoxidized polyalkenylene has an epoxide oxygen content of between 1 and 25% by mass.

2. The process as claimed in claim 1, wherein said reacting is conducted at a temperature of 10 to 100° C.

3. The process as claimed in claim 2, wherein said reacting is conducted at a temperature of 20 to 60° C.

4. The process as claimed in claim 1, wherein said aminophosphonic acid is selected from the group consisting of aminotrismethylene phosphonic acid, aminotris(1-methyl-2,1-ethanediyl)phosphonic acid, {aminotris(1-methylethylidene)}trisphosphonic acid, {{(phosphonomethyl)imino}di-2,1-ethanediyl}bisphosphonic acid, aminotrisetbylidenephosphonic acid, {1-{bis(phosphonomethyl)amino}ethyl}phosphonic acid, aminotrispropylidenephosphonic acid, {{(2 phosphonoethyl)imino}bis(methylene)}bisphosphonic acid, {1,2-ethanediylbis{aminobis(methylene))}}tetrakisphosphonic acid, {1,3-propanediylbis{aminobis (methylene)}}tetrakisphosphonic acid, N2,N2,N5,N5-tetrakis(phosphonomethyl) ornithine and {methylenebis{aminobis(methylene)}}tetrakisphosphonic acid.

5. The process as claimed in claim 1, wherein said carboxylic acid is selected from the group consisting of formic acid, acetic acid, propionic acid and mixtures thereof.

6. The process as claimed in claim 1, wherein said polyalkenylene is selected from the group consisting of 1,4-cis-polyalkenylene, 1,4-trans-polyalkenylene, 1,2-polyalkenylene and mixtures thereof.

7. The process as claimed in claim 1, wherein said polyalkenylene is obtained from 1,3-butadiene, isoprene, 2,3-dimethyl-1,3-butanediene, chloroprene and mixtures thereof.

8. The process as claimed in claim 1, wherein said polyalkenylene is a polybutadiene containing about 75% 1,4-cis-double bonds, about 24% 1,4-trans-double bonds, and about 1% 1,2-double bonds.

9. The process as claimed in claim 1, wherein said polyalkenylene is obtained from at least one diene and at least one comonomer.

10. The process as claimed in claim 9, wherein said comonomer is selected from the group consisting of vinyl compounds, alkenes and mixtures thereof.

11. The process as claimed in claim 1, wherein said epoxidized polyalkenylene is worked up substantially in an aqueous phase.

12. The process as claimed in claim 1, wherein said epoxidized polyalkenylene is worked up exclusively in an aqueous phase.

13. The process as claimed in claim 1, which is conducted substantially or completely without solvent.

14. An epoxidized polyalkenylene obtained by the process according to claim 1.

15. A method of preparing a modified polymer, comprising:
reacting a polymer with the epoxidized polyalkenylene according to claim 14.

16. A crosslinking system, comprising:
the epoxidized polyalkenylene according to claim 14.

* * * * *